United States Patent
Ambler et al.

(10) Patent No.: US 6,926,405 B2
(45) Date of Patent: Aug. 9, 2005

(54) EYEWEAR LENS HAVING SELECTIVE SPECTRAL RESPONSE

(75) Inventors: David M. Ambler, Rancho Palos Verdes, CA (US); Thomas A. Balch, Rancho Palos Verdes, CA (US); Nancy L. S. Yamasaki, Long Beach, CA (US)

(73) Assignee: Younger Mfg. Co., Torrance, CA (US)

( * ) Notice: Subject to any disclaimer, the term of this patent is extended or adjusted under 35 U.S.C. 154(b) by 29 days.

(21) Appl. No.: 10/455,943

(22) Filed: Jun. 6, 2003

(65) Prior Publication Data

US 2004/0246437 A1 Dec. 9, 2004

(51) Int. Cl.[7] .................................................. G02C 7/10
(52) U.S. Cl. ................................................... 351/163
(58) Field of Search ........................ 351/162, 163–165, 351/177

(56) References Cited

U.S. PATENT DOCUMENTS

| | | | |
|---|---|---|---|
| 3,953,117 A | * 4/1976 | Cannon | 353/11 |
| 4,043,637 A | 8/1977 | Hovey | |
| 4,818,096 A | 4/1989 | Heller et al. | 351/163 |
| 4,873,029 A | 10/1989 | Blum | 264/1.3 |
| 4,878,748 A | 11/1989 | Johansen et al. | 351/44 |
| 4,952,046 A | 8/1990 | Stephens et al. | 351/163 |
| 5,135,298 A | 8/1992 | Feltman | 351/163 |
| 5,177,509 A | 1/1993 | Johansen et al. | 351/44 |
| 5,608,567 A | 3/1997 | Grupp | 359/275 |
| 5,625,427 A | 4/1997 | Araujo et al. | 351/159 |
| 5,751,384 A | 5/1998 | Sharp | 349/18 |
| 5,757,459 A | * 5/1998 | Bhalakia et al. | 351/168 |
| 5,922,246 A | 7/1999 | Matsushita et al. | 252/582 |
| 6,102,543 A | 8/2000 | Melzig | 351/163 |
| 6,107,010 A | * 8/2000 | Corniglion et al. | 430/333 |
| 6,145,984 A | 11/2000 | Farwig | |
| 6,334,681 B1 | 1/2002 | Perrott et al. | 351/159 |
| 6,382,788 B1 | 5/2002 | Stehager | 351/163 |
| 6,478,990 B1 | 11/2002 | Powers et al. | 264/1.1 |
| 2002/0006505 A1 | 1/2002 | Nishizawa et al. | 428/220 |
| 2002/0118431 A1 | 8/2002 | Sommer et al. | 359/241 |
| 2003/0030040 A1 | 2/2003 | Luthern et al. | 252/585 |
| 2003/0044620 A1 | 3/2003 | Okoroafor et al. | 428/423.5 |
| 2003/0075816 A1 | 4/2003 | Buazza | 264/1.36 |

FOREIGN PATENT DOCUMENTS

| | | |
|---|---|---|
| EP | 0629656 | 12/1994 |
| WO | WO 03019270 | 3/2003 |

* cited by examiner

Primary Examiner—Scott J. Sugarman
(74) Attorney, Agent, or Firm—Sheppard, Mullin, Richter & Hampton LLP

(57) ABSTRACT

An eyewear lens provides for selective spectral performance in response to varying light conditions, including both changes in intensity and spectral distribution. The lens responds selectively to both ultraviolet and visible light, and exhibits different spectral transmittance characteristics under different lighting conditions, to provide for better vision for a wearer. In addition to this active response, the lens also may include a polarizer to further control light and to minimize the glare that interferes with clear vision.

41 Claims, 3 Drawing Sheets

EYEWEAR LENS HAVING SELECTIVE SPECTRAL RESPONSE

BACKGROUND OF THE INVENTION

An eyewear lens is defined as an optical part for use with the human eye. This may include non-prescription eyewear, such as store-bought sunglasses, prescription eyewear, and semi-finished lens blanks designed to be surfaced to desired prescriptions. This also may include more extreme shapes, such as goggles, visors, face shields, eye shields, helmets and the like. Lenses can be produced from a wide range of optical materials, including glass, glass-like and polymeric materials.

Eyewear lenses typically are designed to improve vision. This improvement is most commonly accomplished by use of a correcting lens that augments the eye's ability to focus light. In addition, eyewear lenses also can improve vision by reducing glare or modifying light exposure (for example, in sunglasses) to enable the eye itself to operate more effectively. Besides augmenting focus and reducing glare, an eyewear lens should ideally adjust to differing light conditions to offer improved visual acuity, regardless of any changes in light level or spectral distribution of that light (that is, the distribution of the light in the wavelengths of the visible spectrum). While certain techniques have been attempted to provide this adjustment, they have not been completely successful.

For example, electrochromic glasses have been produced that enable a wearer to adjust the transmission of the lenses independently of any external lighting. However, these glasses require battery power and/or sensors that may be cumbersome or aesthetically challenging to accommodate in aesthetically appealing fashion eyewear. Also, factors of cost, weight, environmental stability, lifetime, and optical density have been sources of difficulty for these lenses.

Lenses made from photochromic glasses also have been used. These lenses are designed to lighten and darken in response to changes in light intensity. Most stable photochromic systems are designed to respond most preferentially to ultraviolet light, to avoid unwanted darkening of the lens indoors. However, this design criterion often results in photochromics that exhibit low responsiveness in applications in which sunglasses are commonly used, such as behind the windshield of a car, because such windshields filter ultraviolet light. In addition, most photochromic lenses are designed for constant wear. Hence, to ensure that the lenses will not provide too much residual color when worn indoors, photochromic concentration of these lenses has been limited, so that they cannot attain the dark tint of conventional sunglasses, even under the brightest outdoor conditions.

Additionally, in typical lighting situations, glare due to polarized light can interfere with good vision. Glare is particularly troublesome when reflections occur from expansive flat surfaces, such as water or roadways, but it also can be a significant problem under hazy conditions, such as smoggy or foggy skies. While tints, photochromics and electrochromics all reduce total light throughput, only polarized lenses preferentially minimize glare. Hence, polarized lenses offer a unique advantage for providing improved vision. The polarized lens typically is a passive device, however, and it does not adjust optical density to varying lighting conditions. Thus, a dark polarized sunglass lens, which may reduce glare and provide sufficient transmission in full sunlight exposure, may not allow sufficient transmission under low light conditions.

Examples of lenses and related methods combining these light-modifying techniques, or including additional colorants in lenses, are known in the prior art. The visible spectral signature of polarizers has been modified by use of additional passive dyes as described, for example, in U.S. Pat. Nos. 6,382,788, and 4,878,748. However, these modifications may not be sufficient to meet expected lighting or acuity conditions, such as allowing a person wearing the lenses to clearly discern differently colored traffic lights. In addition, such passive filtering has the above-mentioned limitation of insensitivity to varying light intensities or spectral distributions. References such as U.S. Pat. No. 4,818,096 and U.S. Published Patent Application No. 2003/0075816 discuss combining photochromic materials with passive agents that modify the activated color of the resulting photochromic objects. Similarly, patents including U.S. Pat. Nos. 5,625,427 and 6,145,984 disclose combining photochromics with polarizers. As these references indicate, the main objective of prior activities has been to achieve particular constant colors, rather than to tailor the performance of the lenses for optimal visual acuity under varying lighting conditions. Similarly, U.S. Pat. No. 5,608,567 mentions that photochromics and electrochromics may complement each other, because though the photochromics may have limited response behind a car windshield, they can augment the electrochromics outdoors. The invention in U.S. Pat. No. 5,608,567 resides in using the photochromic to control the amount of light that reaches the electrochromic cell, but this mention of combination techniques, albeit with the very different technology of electrochromics, confirms that further advancements in light control are still of great interest.

Therefore, it is apparent that a need exists for optical eyewear lenses having improved response to commonly varying light conditions in comparison to lenses currently available. These lenses should not only adjust to varying light intensity, but they also should tailors the throughput of that light for optimal visual acuity. The present invention fulfills these needs and provides for further advantages.

SUMMARY OF THE INVENTION

The present invention resides in a lens providing active response to light in the ultraviolet-visible spectral region. The lens incorporates the following: 1) a baseline lens portion characterized by a first specified visible light transmission spectrum; 2) at least one first photochromic activated by ultraviolet light in the range of 300–400 nm to produce a first colored, absorbing state in the visible light region; and 3) at least one second photochromic activated by visible light in the range of 400–750 nm to produce a second colored, absorbing state in the visible light region. The lens also can incorporate a polarizer, which can be characterized either by wavelength-selective transmission differences across the visible light region, or by transmission of light that is substantially constant across the visible light region.

In preferred embodiments of lenses of the present invention, the first specified visible light transmission spectrum either is characterized by transmission of light that is substantially constant across the visible light region, or by wavelength-selective transmission differences across the visible light region. In the case of the latter, preferred embodiments of the lens further incorporate absorbers or reflectors of visible light. The first photochromic can be a material different from that of the second photochromic, or the first and second photochromics can be embodied in a single photochromic. In preferred embodiments, the first or second colored, absorbing states can be characterized by wavelength-selective transmission differences across the visible light region. Also, the first colored, absorbing state can be different from the second colored, absorbing state. The lens can further incorporate absorbers or reflectors of ultraviolet light, and preferably can transmit less than 1% of total light having a wavelength below 380 nm.

The present invention also is embodied in a lens providing active response to sunlight, characterized by: 1) a first, highest visible light transmission state during exposure to low light illumination; 2) a second, lowest visible light transmission state during exposure to bright sunlight illumination, and 3) a third, intermediate visible light transmission state during exposure to sunlight filtered through a UV-attenuating window medium, such as an automobile window. Preferably, the third, intermediate visible light transmission state is characterized by absorption arising from at least one photochromic material activated by visible light, and the second, lowest visible light transmission state is characterized by absorption arising from at least one photochromic material activated by ultraviolet light, or by ultraviolet and visible light. The photochromic material also can incorporate at least one first photochromic activated by visible light and at least one second photochromic activated by ultraviolet light. In preferred embodiments, the lens further incorporates a polarizer as described above, or absorbers or reflectors of visible light.

In preferred embodiments of the invention, the first, highest light transmission state is characterized by a luminous transmission of between about 30% and about 85%. The first transmission state preferably is characterized by wavelength-selective transmission differences across the visible light region, which preferably are configured to provide improved visual acuity when the lens is used in low light conditions. In preferred embodiments, the wavelength-selective transmission differences incorporate absorption of visible light that imparts a yellow or yellow-green color to the lens, or reflection of light that imparts a blue or bluish color to the lens. In another preferred embodiment, the second, lowest light transmission state preferably is characterized by a luminous transmission of between about 6% and about 25%. Preferably, the second, lowest light transmission state is characterized by wavelength-selective transmission differences across the visible light region, and it can be configured to provide improved visual acuity under bright sunlight conditions. In preferred embodiments, the wavelength-selective transmission differences result in a reddish or red-blue, or a grey color to the lens. Preferably the third, intermediate light transmission state preferably is characterized by a luminous transmission of between about 10% and about 45%, and it can be characterized by wavelength-selective transmission differences across the visible light region. In preferred embodiments, the wavelength-selective transmission differences impart a brown or red-brown color to the lens.

The present invention also resides in a polarized lens providing active response to sunlight. The lens is characterized by: 1) a first, highest light transmission state during exposure of the lens to low light illumination; 2) a second, lowest light transmission state during exposure of the lens to bright sunlight illumination; and 3) a third, intermediate light transmission state during exposure of the lens to sunlight filtered through a UV-attenuating window medium. The third, intermediate light transmission state preferably is characterized by absorption arising from at least one photochromic material activated by visible light. The second, lowest light transmission state is characterized by absorption arising from at least one photochromic material activated by ultraviolet light, or by ultraviolet and visible light, in which case the photochromic materials can incorporate one photochromic activated by both ultraviolet and visible light. The lens further can incorporate absorbers or reflectors of visible light.

Other features and advantages of the present invention should become apparent from the following description of the preferred methods, taken in conjunction with the accompanying drawings, which illustrates, by way of example, the principles of the invention.

DETAILED DESCRIPTION OF THE PREFERRED EMBODIMENTS

The present invention is embodied in an eyewear lens that is designed for active response to varying natural light conditions, including both changes in intensity and in spectral distribution, without requiring a power source. The lens has selective and active response to varying light intensities and spectral distributions. Specifically, the lens is designed to respond selectively to both UV (ultraviolet) and visible components of sunlight and to changes in their intensities, and to provide tailored spectral filtering for better vision.

In more detailed features of the invention, the lens is designed to respond selectively to both bright sunlight, and diffused or limited sunlight conditions. The lens is further designed to respond to these differences in both direct outdoor exposure, and when exposed through the window of a vehicle, which significantly limits UV light throughput. This is accomplished by incorporating into the lens: 1) coloration for a baseline, highest transmittance value suitable for low light levels; 2) photochromic agents that are selectively activated by visible light for lower transmittance and for coloration when exposed to higher light levels, even behind the window of a vehicle; and 3) photochromic agents that are selectively activated by UV light for coloration and still lower transmittance when exposed to higher, direct light levels.

In a preferred embodiment of the invention, the coloration is designed to change for the different lighting conditions, such that the lens' spectral response is tuned for improved visual acuity with the particular intensity and spectral distribution of the light. In another preferred embodiment, polarizers are additionally used to further control light and minimize the glare that interferes with clear vision. The lenses of the present invention are suitable for both prescription and non-prescription optical parts, and may be used in a wide range of eyewear including goggles, visors, shaped masks and face shields.

As stated above, the lens of the present invention is optimized to provide improved visual responsiveness to varying natural lighting conditions, by incorporating specific optical characteristics, such as color and transmittance, and also by incorporating photochromics to actively change these properties in response to varying lighting conditions.

Figure 1:
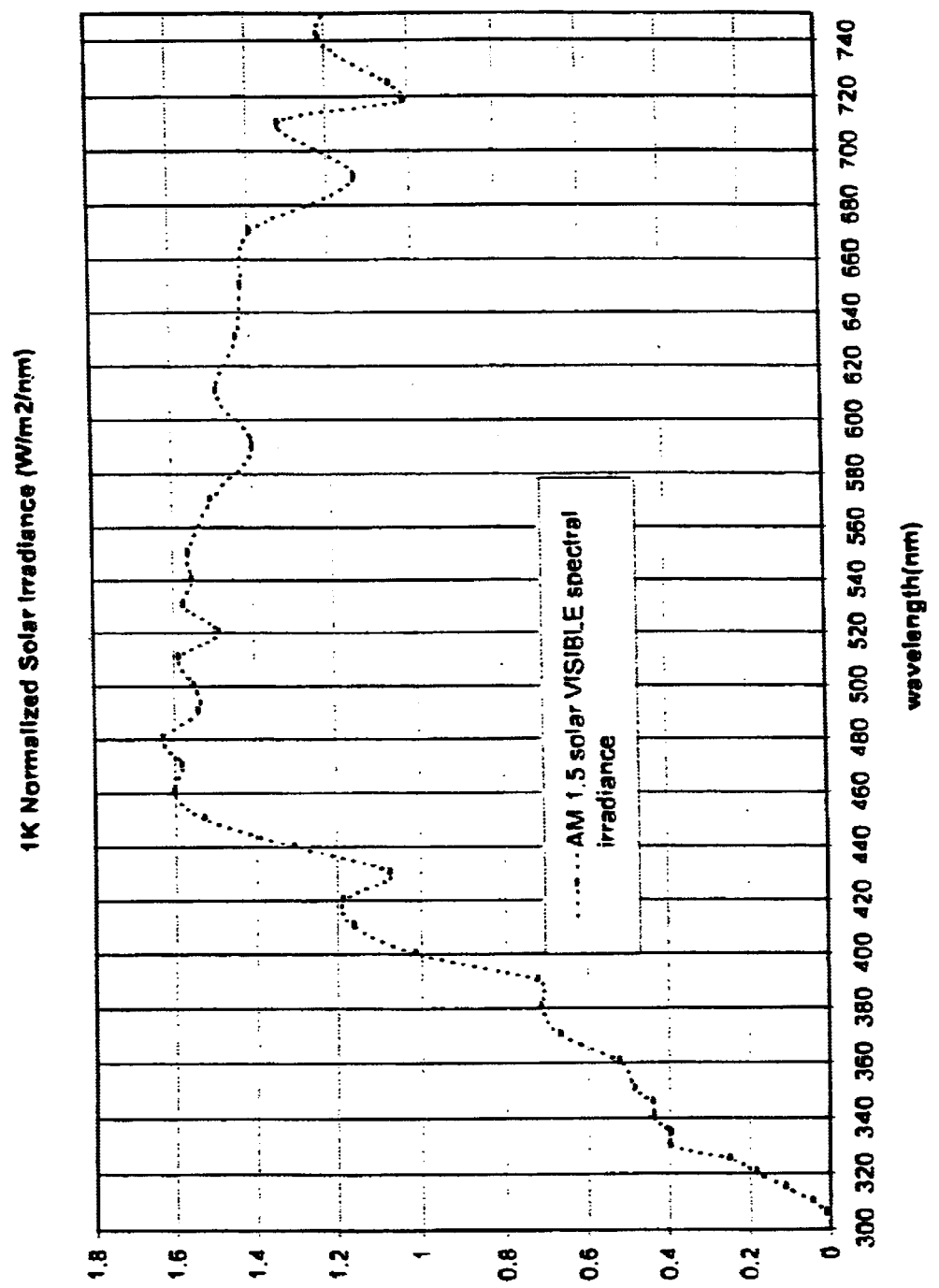
FIG. 1 shows the visible and near UV regions of a standard solar spectrum (AM1.5) irradiance plot, normalized to 1,000 over the wavelength region 305 nm to 750 nm.

The design of this lens considers and accommodates several factors. First, it takes into account the solar spectrum in the Earth's atmosphere. FIG. 1 shows the standard near UV-visible spectral plot at an air mass of 1.5, including scattering radiation from the sky, as viewed from sea level through the atmosphere with a 37 degree south-facing tilt. The 300–400 nm is the near-UV region, and the region from 400–700 nm is the visible spectra. Most sunlight at wavelengths less than 300 nm is absorbed by the earth's atmosphere, and the sun's visible spectral intensity peaks near 480 nm. While FIG. 1 shows representative intensities of sunlight irradiance, the actual values and their relative spectral distribution will vary with cloudy or hazy skies, additional diffuse scattering contributions, and the changing position of the sun. In fact, as the sun approaches the horizon or scattering effects increase, total light irradiance decreases markedly, but the relative component of near-UV and blue light increase. In addition, several studies have shown that near-UV light may be damaging to the eyes. Therefore, for best visual response, an eyewear lens should provide good transmission of the visible component of the light, along with effective blocking of the UV component of the light, even in low light conditions.

The eye's light sensitivity and spectral discernment are known to change as a function of light intensity. The eye has two types of photodetectors: rods and cones. In low light conditions, the rods detect light very sensitively, but they do not discriminate color. Therefore, in low light conditions, visual responsiveness peaks at about 507 nm, near the center of the visible spectrum. As light levels increase, the sensitive rod detectors are saturated or photobleached, and the color-discerning cones become the more dominate photodetector. Beta, gamma and rho cones exhibit different, though overlapping, wavelength detection regions across the visible spectrum, and their wavelength sensitivity distributions peak at approximately 445 nm, 535 nm, and 575 nm, respectively. While the eye contains only about 2% beta cones and 64% rho cones, the eye's sensitivity to light in the low wavelength region (near 445 nm) is comparable to the other visible regions; though there are fewer detectors (beta cones), they are more sensitive. Thus, under bright light conditions, the overlapping detection regions of the cones define a peak color sensitivity near 555 nm. This known change in the eye's responsiveness to light and color suggests that a lens having different visible transmission, and possibly different spectral response, in low light versus bright light conditions is desirable for optimal tailoring to the eye's response mechanisms. The present lens includes such spectral response, as discussed below.

Figure 2:
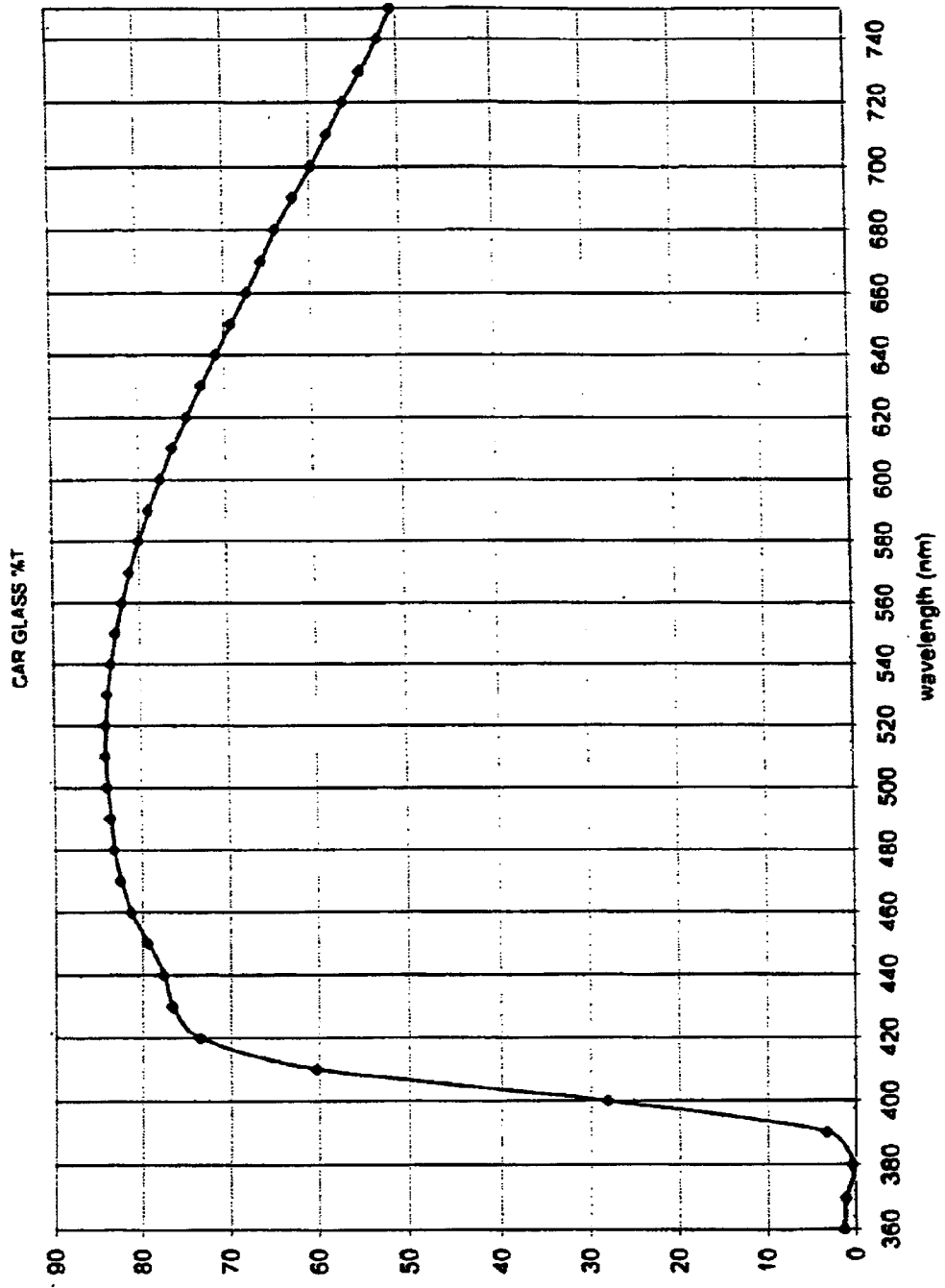
FIG. 2 shows the transmittance of a typical automobile windshield over the region of visible light.

The lens of the present invention also is designed for superior performance during travel in an automobile or other windowed vehicle. This is another important feature of the lens, because such travel is a typical adjunct to most outdoor activities. FIG. 2 shows the visible spectral transmission of a typical laminated glass windshield structure. As mentioned above, while photochromics can actively respond to light intensity changes, most are near-UV activated. It is clear from FIG. 2 that with the laminated glass' cutoff of transmitted light near 400 nm, such photochromics will not be strongly activated within a windowed vehicle. Ultraviolet light cut-off or reduction also is typical for other glass and plastic window materials. Yet often it is precisely in an windowed vehicle, particularly as a driver, that one has a significant need for decreased and controlled light exposure, without compromising visual acuity. The lens of the present invention is designed to address this need.

In view of these considerations, at least four common lighting conditions can be defined that would benefit from active, selective response by lenses within the scope of the present invention. These conditions are: 1) Low light, outdoor exposure; 2) low light exposure through a window; 3) bright light exposure through a window; and 4) bright light, outdoor exposure. These conditions can be further defined in terms of the light spectrum presented and detected by the eye in each of these four conditions, as is described in Table 1 below.

TABLE 1

Lighting conditions and eye response

| Lighting condition | Light spectral intensity | Eye's response to lighting condition |
|---|---|---|
| Low light, outdoor exposure | UV: low<br>Visible: low | May cause damage<br>Rod detection of intensity with max near 507 nm, limited color discernment |
| Low light through window | UV: very low -effectively blocked below 390 nm<br>Visible: low | —<br>Rod detection of intensity with max near 507 nm, limited color discernment |
| Bright light through window | UV: very low -- effectively blocked below 390 nm<br>Visible: moderate | —<br>Cone detection of color with local maxima near 445, 535 and 575 nm, giving an average max sensitivity near 555 nm |
| Bright light, outdoor exposure | UV: moderate<br>Visible: high | May cause damage<br>Cone detection of color with local maxima near 445, 535 and 575 nm, giving an average max sensitivity near 555 nm |

The lenses of the present invention preferably provide a higher level of transmission for low light conditions than for bright light conditions, and will actively respond to increasing light intensity by darkening. In addition to these changes in the average transmission, the lenses preferably provide wavelength-selective transmission that is spectrally tailored for improved visual acuity within the different lighting conditions described above; that is, the apparent color of the lens, as well as its overall transmission, changes. Hence, in low light, when the rods of the eye are most active, the lenses exhibit a different average transmission and a different wavelength-selective transmission than it does under bright light conditions, when the color-discerning cones are most active. In a further aspect of the present invention, the lenses provide an intermediate level of average transmission and wavelength-selective transmission in response to bright light perceived through a UV-filtering window.

Preferred lenses within the scope of the present invention incorporate photochromic (light-activated) absorption in the visible region. While electrochromic techniques also can be used, they require additional power sources, as well as possibly detectors and feedback controls, making the lens assembly much more cumbersome. In contrast to previously known lenses, preferred embodiments of the lenses of the present invention incorporate both UV-activated and visible light-activated photochromics. By combining both UV and visible light activation in the present invention, the actively-responding lens provides: 1) a lowest transmittance under outdoor exposure to bright light containing strong components of both UV and visible light; 2) an intermediate transmittance, due to the lesser response of the UV-activated photochromic, when bright light is viewed through a UV-filtering window; 3) higher transmittance under low light outdoor conditions that can provide only limited energy to initiate either the UV or visibly-activated absorbance of the photochromic agents; and 4) highest transmittance under low light conditions when light is filtered through a window that effectively removes all or a large portion of the UV component of the low light spectrum. Under bright outdoor light exposure, the average luminous transmittance of the lens is preferably in the range of approximately 6% to about 25% transmittance. A preferred range for the intermediate transmittance of the lens is an average luminous transmittance of about 10% to about 45%. Under the low light conditions, a preferred range for the average luminous transmittance of the lens is about 30% to about 85%.

This stepped, active control of transmission in response to different light levels is one important aspect of the lenses of the present invention. Another important aspect of the lenses of the present is the wavelength-selective tailoring of the successive transmission curves of the lenses to improve visual acuity. As indicated in Table 1, under low light conditions, the rods in an eye provide poor color discrimination. Therefore, a highly varying transmission spectrum for a lens having marked maxima and minima in different visible wavelength locations may not be needed or even especially effective, given the color insensitivity. Instead, keeping the transmission relatively high throughout the visible region may be more effective in optimizing any light presented to the eye. While high transmission is indeed important under low light conditions, visual acuity, as determined by the ability to differentiate fine details in normal distance viewing, surprisingly is improved by some absorption in the shorter wavelength region of the visible spectrum. Specifically, higher relative transmission near the scotopic sensitivity maximum near 505 nm than at shorter wavelengths gives improved definition when viewing fine details. This wavelength-selective improvement is also observed under hazy or overcast low light conditions, which may be due to the lens limiting the eye's exposure to the increased amount of blue light scatter under these lighting conditions. Hence, the base color and transmission of the lens can be selected to provide acceptable transmission under general low light conditions, and if desired, can be further tailored to provide higher transmission nearer 505 nm than in lower wavelength regions.

A preferred base color and transmission can be achieved by adding coloring agents to the lens itself, or to coatings or films incorporated with the lens. Coloring agents are standard materials known to the optics industry, and include dyes, pigments, UV absorbers, thin film coatings, interference filters, and the like. These coloring agents interact with light by mechanisms such as absorption or reflection. Their response may be broadband, meaning that the agents interact approximately equally with wavelengths of light over a broad spectral region, or they may be wavelength-selective reflectors or absorbers. For example, if a coloring agent absorbs selectively in the blue region of the visible spectrum, the object usually shows a yellowish color (i.e., absence of blue). An example of such an absorbing coloring agent is a as a dye or pigment. On the other hand, if the coloring agent selectively reflects this light, then the object may appear bluish to an outside viewer, because the blue wavelength region is preferentially reflected back to the viewer. An example of such as a reflective coloring agent is a coating or interference thin film filter designed to provide reflection. Hence, wavelength-selective agents also can impart different perceived colors to the lens, depending upon their mechanism of operation.

Under low light conditions, the visible and UV-activated photochromics also may contribute somewhat to the baseline color and absorbance of the lens. However, a single baseline spectral design may be effective for both low light conditions (i.e., directly viewed or filtered through a vehicle window), due to the low levels of light available for activation of either type of photochromic. Nonetheless, the baseline color and transmittance of the lens may include some limited effect from photochromic, or other light-activated absorbing, agents.

In a preferred embodiment of the present invention, the lens includes a polarizer to reduce glare that may also interfere with visual acuity. The presence of a polarizer will contribute to the baseline color and transmittance of the lens, and may alter the quantities or varieties of other coloring agents needed to achieve a desired spectral result. A wide range of polarizers may be used, and include neutral grey polarizers, colored polarizers, polarizers that incorporate reflectors or reflective interference stacks, and the like. Thus, the polarizer also may exhibit broadband or wavelength-selective transmittance control, as well as glare reduction, and both features can be suitably designed into the lens' performance. In addition, the polarizer can be combined with other coloring agents, such as those mentioned above. If reflective coloring agents, broadband reflectors or interference filters are used with a polarizer, these agents preferably are placed such that the incoming light strikes the polarizer before the reflective agents. This ensures that the polarizer can operate most efficiently to reduce incoming glare, without any stray light rotation or randomization caused by the reflective or interference effects of these particular coloring agents. Alternatively, some polarizers created with thin film interference stacks can incorporate both specific wavelength control (reflection, absorption or transmission), while achieving a high degree of polarization.

As discussed above, many different combinations of techniques can be used within the lenses of the present invention to create the baseline conditions of both overall transmittance and, if desired, wavelength-selective transmittance. Then, to achieve desired lower transmission under bright light conditions, a UV-activated photochromic with resultant absorption in the visible region can be used in the lenses of the present invention. Such photochromics include, for example, those described in U.S. Pat. No. 4,818,096, herein incorporated by reference, as well as various photochromics developed by Transitions Optical, Inc. and used in their Transitions® photochromic lens technologies. The UV-activated photochromics may be incorporated into the lens using various known processes, including integral mixing into the base lens material, imbibing into the surface of the lens, incorporation into lens coatings, and use of photochromic films or laminates that are embedded or included into or onto the lens.

The lens of the present invention also includes photochromics capable of visible-light activation for additional response to brightest outdoor light conditions, and for active response behind UV-attenuating windows. These are likewise incorporated with the lens using the various known processes discussed above. The particular photochromics to be used in the lens depend on the transmission and spectral distribution desired, the specific activation characteristics of the photochromics, and possibly also on the particular lens material and other additives for coloring or lens stability. Many photochromics actually respond to light over a wide wavelength region that may overlap both the UV and visible spectra. This has been a concern addressed in previous optical applications, as discussed in U.S. Pat. Nos. 4,818,096 and 6,102,543, herein incorporated by reference.

However, in the present invention, this overlap may be used advantageously to achieve particular color and transmission values for the different lighting conditions described above.

Therefore, though the photochromics for use in the present invention are designated as either UV- or visible light-activated, they also can exhibit some additional response to the other wavelength region. In fact, in the present invention, a lens incorporating one or more photochromics exhibiting marked activation in both the visible and UV regions may be advantageously controlled for response in either or both regions by the use of coloring agents. This selective response can be achieved using various techniques, including filters, passive light absorbing dyes or pigments, and absorbing or reflective agents interposed between the photochromic and the light source. This combination of coloring agents and the photochromics may be used as another control mechanism or designed process variable in the lens of the present invention. As needed, the coloring agent can be positioned to either modulate the amount of light reaching the photochromics, or to allow the photochromics to be fully illuminated. In an additional preferred embodiment of the lenses of the present invention, reflective agents are placed behind the photochromics and are designed to reflect the activating spectra. These agents can increase photochromic activity of the lens by providing an extra passage of reflected light through the photochromic layer. Hence, many different combinations of elements can be used in lenses of the present invention to control, alter and optimize the lens' active response to light.

Depending on responsiveness and competing reactions, certain photochromics may be more effectively used either singly or in combination to achieve a desired optical effect. This may result, for example, in optimized color, color density, or color consistency throughout the range of a given lighting condition. In addition, a given photochromic may act as a coloring agent with respect to another photochromic, by blocking incoming light due to preferential absorption, or by selectively filtering the light. Moreover, some photochromic materials may be more compatible with certain lens materials, coloring agents, or lens production techniques than other photochromics. For instance, often photochromic properties are degraded by the high heat of injection molding processes that may be used to produce thermoplastic lenses. Similarly, if heat-sensitive polarizers are also incorporated in the lens, they may tolerate even less high temperature exposure than the photochromics, and could lose efficiency or change color with overheating. If such factors have not been accommodated when combining the lens, lens materials, and lens additives with photochromics, the desired resulting color or transmission may not be achieved, or may not be stable with time or environmental exposure.

Another preferred aspect of the lenses of the present invention incorporates coloring agents and photochromic materials that tailor a wavelength-selective transmission curve for these bright light conditions, as well as control overall transmission. In bright light conditions, the cones providing good color-discernment dominate the eye's response. Preferably, then, transmission through the lens should allow good definition across the visible spectrum. It has been surprisingly found that under bright light conditions, good definition can be maintained even when the lens is designed such that the coloring agents and/or photochromics create local transmission maxima and minima in different regions of the visible spectra. These maxima and minima correspond to wavelength-selective transmission differences and impart particular colors to the lens by preferentially reflecting or absorbing specific wavelengths of light. Hence, many fashionable colors may be created without compromising the performance of the lens of this invention. However, extreme cut-offs in the visible region should be avoided. First, a marked cut-off will limit sensitivity to that spectral region, and therefore affect acuity for objects in that color range. Second, color recognition and transmission should be sufficient to pass the red, yellow, green traffic signal tests, as defined in ANSI Z80.3-1986. Lenses with extreme cut-offs often fail these tests.

One preferred color for direct outdoor bright light conditions has a relative minimum near about 500 nm, and equal or higher transmission in the blue region. This keeps the blues rich in appearance, while maintaining good green and red sensitivity. One rationale for this color preference is that the relatively high blue transmission ensures good visual response from the limited number of beta cones, while maintaining sensitivity in the other spectral regions having more receptors. If this spectral response is achieved by wavelength-selective absorption, the lens will appear reddish, or red-blue. Another exemplary color is a neutral grey, which gives approximately equal transmittance throughout the visible spectra.

Other colors may be engineered or selected for use of the lens in particular outdoor activities, or on the basis of fashion considerations. For example, a water polo player might prefer a color for bright outdoor use different from that preferred by a motocross racer. Therefore, one could envision lenses of the present invention designed with distinctive or preferred colors for use in particular sports, hobbies, or professional activities. The variety of coloring agents, photochromics and optional polarizers that can be combined in the lens of the present invention enable such designs.

Behind a window of a vehicle such as a car, train, or ferry, the UV component of sunlight will be appreciably attenuated or blocked by the intrinsic or the designed cut-off of the window material. Therefore, UV-activated photochromics will respond more weakly, if at all, to light presented through the window. However, the photochromics activated by visible light will respond and can be designed to affect the transmittance and/or color of the lens under these filtered, bright light conditions.

One preferred color under these lighting conditions, when color is the result of absorbance, is a brownish hue. This provides sharp contrast for driving conditions with typical sunlight intensities, allowing good recognition of traffic signals and good visual acuity for other objects. A brownish lens has transmittance that increases toward the red region of the visible spectra, where the majority of cones are most sensitive. In fact, the color-sensitivity of the gamma and rho cones overlap extensively throughout the 550–650 nm region, allowing high response from about 98% of the cone receptors. In addition, as the sun nears the horizon, or under hazy bright light conditions, the relative irradiance of the longer wavelength region (red end) of the sunlight spectrum is decreased even more markedly than the short wavelength region. Therefore, increased transmittance in this red wavelength region may be desirable for good acuity under such lighting conditions.

Lenses of the present invention may provide additional freedom in color selection and transmittance from other known lenses due to possible competing pathways for visible and UV excitation of photochromics. For example, if a UV-activated change by a photochromic material takes much less energy than that required to activate the same or another selected photochromic in the visible region, the UV-activated material may continue to be a contributor to color even behind a window. Alternately, a particular photochromic that can be activated by both visible and UV light may show different spectral maxima and minima depending on the relative influence of each wavelength region. When these variables are combined with the fundamental coloration of the lens, there is wide control of color choices for both vision and fashion needs. For example, as mentioned previously, a lens providing reduced transmittance in the short wavelength region can appear either yellow if absorbance occurs, or blue, if the short wavelength light is selectively reflected.

Additionally, various techniques may be used to control the UV light that either reaches the eye, or activates the lens' photochromics. Within the optical industry, various standard methods are used to control or eliminate UV exposure. These include such methods as incorporation of UV absorbers, pigments and cut-off dyes into or onto the lens material, the use of UV absorbing or reflecting coatings, and interference filters. In addition, UV-activated photochromics, or visible-light activated photochromics that still respond to ultraviolet light may also provide active control of UV exposure, and the other methods may be modified accordingly. Similarly, in the present invention, the attenuation due to window media, and the lower UV irradiance under low light conditions also may be taken into account when designing further UV limits into the lens. In one preferred embodiment, the lens will exhibit very low light transmittance below 380 nm to protect the eye from UVA and UVB exposure. Sharp UV cut-off methods may be used when limited effect on the visible transmission of the lens is desired. Alternatively, the cut-off may be gradual or structured to significantly reduce UV while tailoring the visible transmission. For bright light conditions, one preferred embodiment exhibits less than about 1% transmittance below 380 nm.

While natural sunlight conditions have been discussed, the lenses of the present invention also may adapt to interior lighting intensities and spectral variations. With an embodiment optimized for response to sunlight, the interior lighting would not be expected to activate the photochromics as strongly as sunlit conditions, but they may cause some change in absorbance and color depending on the lighting spectra. For instance, if exposed to intense incandescent lights that approximate a blackbody source, the visible-activated photochromics may contribute some optical density and color to the lenses. In the preferred embodiments mentioned above, this would shift the lens to have a slightly brown tint. Similarly, in bright fluorescent or halogen lighting, the UV-sensitive photochromics may be slightly activated as well as the visible photochromic(s). Again, for the example of the preferred embodiment, this would give the lens a slightly grey or reddish tint.

The invention will now be described in additional detail with reference to the following example.

EXAMPLE

A hard resin lens is prepared incorporating coloring agents, such that the lens exhibits a spectrum characterized by a lower transmittance in the 400–450 nm region, and increasing transmittance in the 450–500 nm region. In this example, the lower transmittance in the 400–450 region is achieved by absorption, giving a yellowish color to the lens. The lens contains an embedded polarizer, characterized by a polarization coefficient of at least 90% and approximately 40–50% luminous transmittance, as a passive device to reduce polarized glare under all lighting conditions. At least one photochromic material capable of activation by visible light is incorporated into the lens such that, when activated, it decreases visible light transmittance of the lens, and imparts a brownish color to the lens, due to decreased transmittance in the 450–550 nm region. Additionally, at least one photochromic material capable of activation by UV light is incorporated into the lens such that, when activated, it further decreases the visible light transmittance of the lens, and imparts a reddish-blue color, due to a local transmittance minimum near 520 nm, but somewhat higher relative transmittance in the blue region of the spectrum. If required, additional materials can be incorporated into the lens to limit UV exposure of the eye, resulting in less than 1% transmittance below 380 nm.

The expected response and appearance of this lens, given the various light conditions outlined in Table 1, is summarized in Table 2.

TABLE 2

Response to different lighting conditions.

| Lighting condition | Light spectral intensity | Response of the elements of the Example for given lighting condition | Appearance of Example for given lighting |
|---|---|---|---|
| Low light, outdoor exposure | UV: low<br>Visible: low | Excess UV blocked with passive or active agents<br>Baseline color: +++<br>Polarizer: +++<br>Visible-activated photochromic: +<br>UV-activated photocromic: + | Yellowish to yellow-green high visible transmission |
| Low light through window | UV: very low-- effectively blocked below 390 nm | Excess UV blocked with passive or active agents<br>Baseline color: +++<br>Polarizer: +++<br>Visible-activated photochromic: +<br>UV-activated photochromic: − | Yellowish, highest visible transmission. |
| Bright light through window | UV: very low - effectively blocked below 390 nm | Excess UV blocked with passive or active agents<br>Baseline color: +++<br>Polarizer: +++<br>Visible-activated photochromic: ++<br>UV-activated photochromic: −/+ | Brown, intermediate visible transmission |

TABLE 2-continued

Response to different lighting conditions.

| Lighting condition | Light spectral intensity | Response of the elements of the Example for given lighting condition | Appearance of Example for given lighting |
|---|---|---|---|
| Bright light, outdoor | UV: moderate | Excess UV blocked with passive or active agents | |
| | Visible: high | Baseline color: +++ Polarizer: +++ Visible-activated photochromic: +++ UV-activated photochromic: +++ | |

Figure 3:
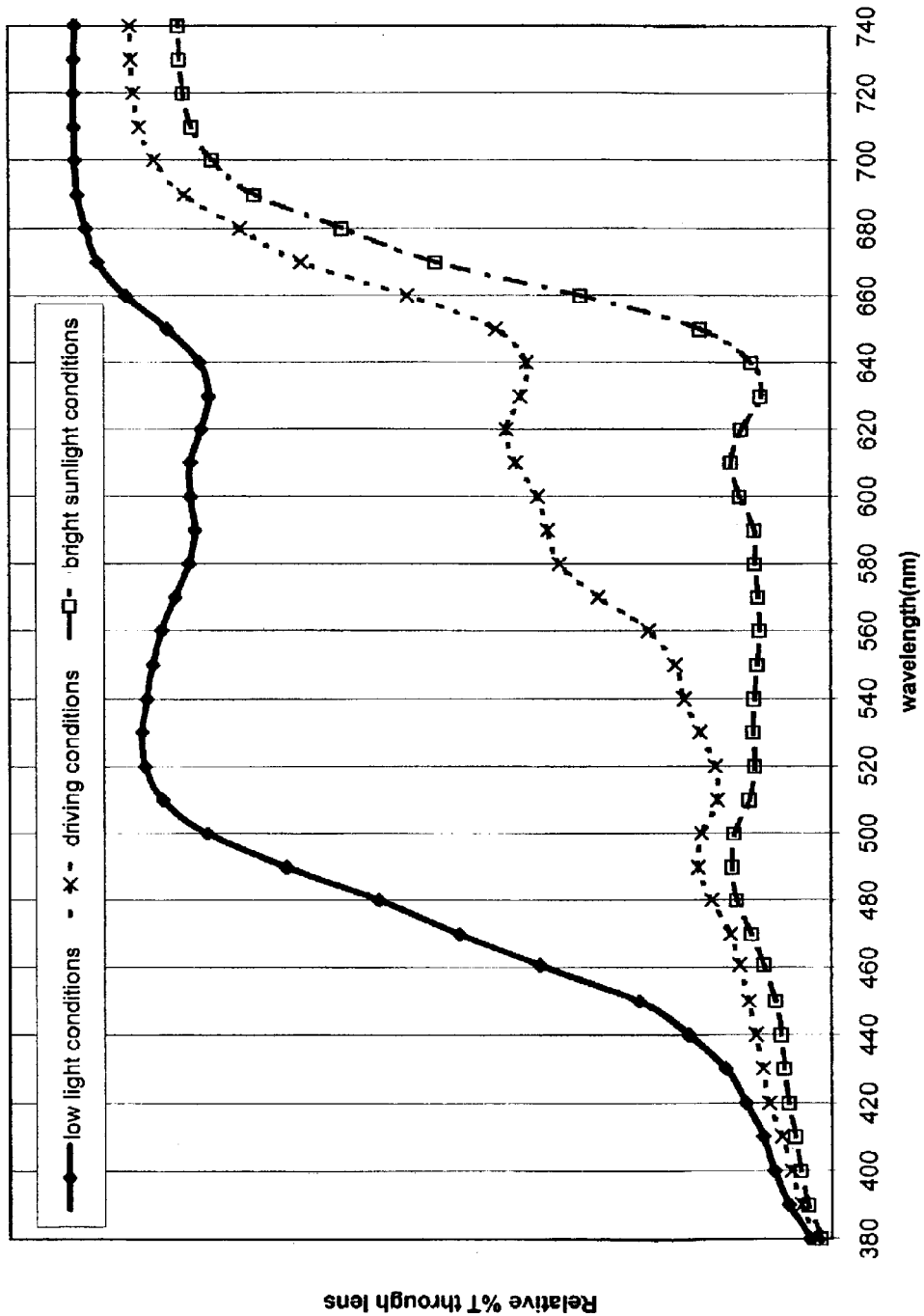
FIG. 3 shows an exemplary visible spectral response for a lens within the scope of the present invention, optimized for three distinct lighting conditions: low intensity sunlight, bright sunlight, and typical driving conditions.

+++ = very active response
++ = moderately active response
+ = less active response
+/− = limited if any response
− = minimal response Exemplary transmission spectra for the Example lens under different lighting conditions are shown in FIG. 3. Only one exemplary transmission curve is shown for low light conditions, because this may be similar in both direct outdoor exposure, or through a UV-attenuating window. Accordingly, a lens with active and selective response to natural light is obtained, which furthermore changes color to optimize visual acuity for the different lighting conditions.

Although the invention has been disclosed in detail with reference to the preferred materials and spectral properties, those skilled in the art will appreciate that additional materials, or combinations of materials and techniques can be used to attain the same spectral properties, and also additional spectral properties without departing from the scope of the invention. Accordingly, the invention is identified by the following claims.

We claim:

1. A lens providing active response to light in the ultraviolet-visible spectral region, the lens comprising:
 a baseline lens portion characterized by a first specified visible light transmission spectrum;
 at least one first photochromic activated by ultraviolet light in the range of 300–400 nm to produce a first colored, absorbing state in the visible light region;
 at least one second photochromic activated by visible light in the range of 400–750 nm to produce a second colored, absorbing state in the visible light region; and
 a polarizer.

2. A lens as defined in claim 1, wherein the polarizer is characterized by wavelength-selective transmission differences across the visible light region.

3. A lens as defined in claim 1, wherein the polarizer is characterized by transmission of light that is substantially constant across the visible light region.

4. A lens as defined in claim 1, wherein the first specified visible light transmission spectrum is characterized by transmission of light that is substantially constant across the visible light region.

5. A lens as defined in claim 1, wherein the first specified visible light transmission spectra is characterized by wavelength-selective transmission differences across the visible light region.

6. A lens as defined in claim 5, wherein the lens further comprises absorbers or reflectors of visible light.

7. A lens as defined in claim 1, wherein the at least one first photochromic comprises a material different from that of the at least one second photochromic.

8. A lens as defined in claim 1, wherein the first colored, absorbing state is characterized by wavelength-selective transmission differences across the visible light region.

9. A lens as defined in claim 1, wherein the second colored, absorbing state is characterized by wavelength-selective transmission differences across the visible light region.

10. A lens as defined in claim 9, wherein the first colored, absorbing state is different from the second colored, absorbing state.

11. A lens as defined in claim 1, wherein the lens further comprises absorbers or reflectors of ultraviolet light.

12. A lens as defined in claim 11, wherein the lens transmits less than 1% of total light having a wavelength below 380 nm.

13. A lens providing active response to sunlight, characterized by:
 a first, highest visible light transmission state during exposure to low light illumination;
 a second, lowest visible light transmission state during exposure to bright sunlight illumination; and
 a third, intermediate visible light transmission state during exposure to sunlight filtered through a UV-attenuating window medium.

14. A lens as defined in claim 13, wherein the UV-attenuating window medium is an automobile window.

15. A lens as defined in claim 13, wherein the third, intermediate visible light transmission state is characterized by absorption arising from at least one photochromic material activated by visible light.

16. A lens as defined in claim 13, wherein the second, lowest visible light transmission state is characterized by absorption arising from at least one photochromic material activated by ultraviolet light.

17. A lens as defined in claim 13, wherein the second, lowest visible light transmission state is characterized by absorption arising from at least one photochromic material activated by ultraviolet and visible light.

18. A lens as defined in claim 17, wherein the at least one photochromic material comprises at least one first photochromic material activated by visible light and at least one second photochromic material activated by ultraviolet light.

19. A lens as defined in claim 13, wherein the lens further comprises a polarizer.

20. A lens as defined in claim 19, wherein the polarizer is characterized by wavelength-selective transmission differences across the visible light region.

21. A lens as defined in claim 19, wherein the polarizer is characterized by transmission of light that is substantially constant transmission across the visible light region.

22. A lens as defined in claim 13, wherein the lens further comprises absorbers or reflectors of visible light.

23. A lens as defined in claim 13, wherein the first, highest light transmission state is characterized by a luminous transmission of between about 30% and about 85%.

24. A lens as defined in claim 13, wherein the first transmission state is characterized by wavelength-selective transmission differences across the visible light region.

25. A lens as defined in claim 24, wherein the wavelength-selective transmission differences are configured to provide improved visual acuity when the lens is used in low light conditions.

26. A lens as defined in claim 24, wherein the wavelength-selective transmission differences comprise absorption of visible light imparting a yellow or yellow-green color to the lens.

27. A lens as defined in claim 26, wherein the wavelength-selective transmission differences comprise reflection of light imparting a blue or bluish color to the lens.

28. A lens as defined by claim 13, wherein the second, lowest light transmission state is characterized by a luminous transmission of between about 6% and about 25%.

29. A lens as defined in claim 13, wherein the second, lowest light transmission state is characterized by wavelength-selective transmission differences across the visible light region.

30. A lens as defined in claim 29, wherein the wavelength-selective transmission differences are configured to provide improved visual acuity under bright sunlight conditions.

31. A lens as defined in claim 29, wherein the wavelength-selective transmission differences results in a reddish or red-blue color to the lens.

32. A lens as defined in claim 29, wherein the wavelength-selective transmission differences results in a grey color to the lens.

33. A lens as defined in claim 13, wherein the third, intermediate light transmission state is characterized by a luminous transmission of between about 10% and about 45%.

34. A lens as defined in claim 13, wherein the third, intermediate light transmission state is characterized by wavelength-selective transmission differences across the visible light region.

35. A lens as defined in claim 34, wherein the wavelength-selective transmission differences impart a brown or red-brown color to the lens.

36. A polarized lens providing active response to sunlight, the lens characterized by:

a first, highest light transmission state during exposure of the lens to low light illumination;

a second, lowest light transmission state during exposure of the lens to bright sunlight illumination; and a third, intermediate light transmission state during exposure of the lens to sunlight filtered through a UV-attenuating window medium.

37. A lens as defined in claim 36, wherein the third, intermediate light transmission state is characterized by absorption arising from at least one photochromic material activated by visible light.

38. A lens as defined in claim 36, wherein the second, lowest light transmission state is characterized by absorption arising from at least one photochromic material activated by ultraviolet light.

39. A lens as defined in claim 36, wherein the second, lowest light transmission state is characterized by absorption arising from photochromic materials activated by ultraviolet and visible light.

40. A lens as defined in claim 39, wherein the photochromic materials comprise one photochromic activated by both ultraviolet and visible light.

41. A lens as defined in claim 36, wherein the lens further comprises absorbers or reflectors of visible light.

* * * * *